United States Patent Office 3,245,420
Patented Apr. 12, 1966

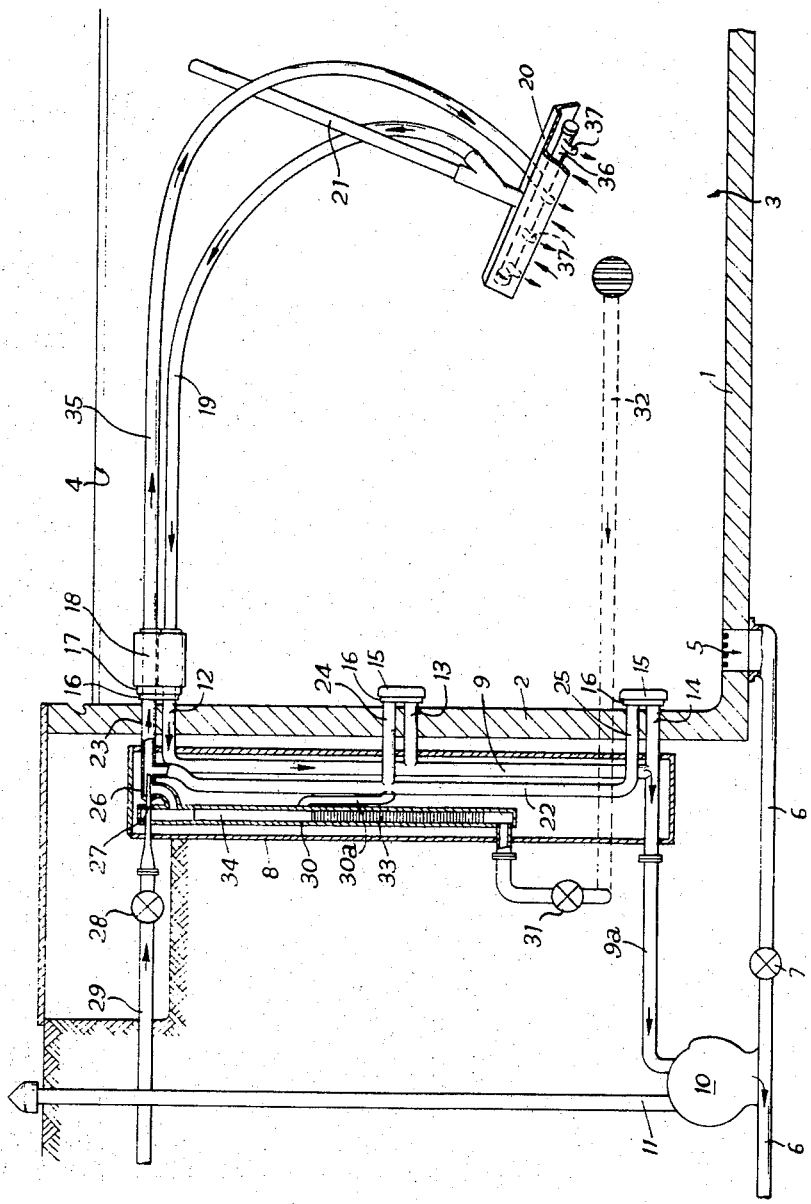

3,245,420
CLEANING APPARATUS FOR LIQUID
CONTAINERS
Alexander John Cherney, 53 Shakespeare Road,
London NW. 7, England
Filed Sept. 9, 1964, Ser. No. 395,224
5 Claims. (Cl. 134—101)

This invention relates to cleaning apparatus for liquid containers such as swimming baths, water storage tanks and the like, its object being to provide an improved construction which permits both disturbing and removal of sediment respectively by pressurized liquid feed and by siphon action of liquid derived from the container, without requiring additional powering means such as electrically-operated pumps. A further feature is that the pressurized liquid feed may also serve for withdrawal and recirculation of liquid into the container after passage through a treatment chamber, e.g. for filtering and bacteriological purification.

According to the present invention, a cleaning apparatus for liquid containers, such as swimming baths, water-storage tanks and the like comprises a collector device for sediment having means for outflow of liquid to disturb the sediment and means for inflow of liquid containing sediment, hose means connected to the collector device having inflow and outflow passages, a siphon operable by liquid derived from the container and connected to the outflow passage of the collector, and pressurized liquid supply means connected to the inflow passage of the collector.

With the apparatus as so far described, a pressurized flow of fresh liquid, e.g. main water, may be fed to the collector and delivered under pressure into the container for the purpose of disturbing any sediment which may be adherent to the internal surfaces thereof. At the same time, by use of liquid derived from the container, the siphon causes a suction which draws the sediment-containing water out through the collector and allows it to be carried away to a disposal point, e.g. to a main drain for the container.

According to a further feature of the invention, there may be provided a jet and venturi device having its jet connected to the pressurized liquid supply, a processing chamber connected to the venturi, and an outflow passage in the container connected to the processing chamber. When the pressurized liquid flows through it, the jet causes a lowering of relative pressure in the venturi tube. This suction is applied to the processing chamber and causes liquid to be drawn out of the container and passed through the processing chamber, after which it passes through the venturi and mingles with the pressurized supply flowing through the hose means and the collector device into the container again. Accordingly a proportion of the total liquid content of the container is continually being extracted, passed through the processing chamber, and returned into the container. The processing chamber may be equipped with means for filtering the extracted liquid, and for purifying it bacteriologically. Such filtering means and purifying means are advantageously readily replaceable in the processing chamber.

It will be appreciated that, as the liquid of the container is used for operating the suction siphon, the level thereof in the container will tend to drop. Accordingly, to permit making use of the liquid supply substantially irrespective of its level in the container, the siphon and the pressurized liquid supply may each have a number of respective inlets and outlets arranged adjacent each other and at different levels within the container, the hose means being connectable to any selected set of inlets and outlets according to the prevailing liquid level.

For the collection of any relatively larger foreign bodies, e.g. twigs or buttons, taken in by the collector, the outflow passage of the hose means advantageously includes a filter. This filter may conveniently be incorporated in a housing at the end of the hose means connected to the inlets and outlets.

Where the container itself has a main drain, the siphon may conveniently be connected at its outlet to said main drain through a siphon seal.

In order that the nature of the invention may be readily ascertained, an embodiment of swimming bath cleaning apparatus in accordance therewith is hereinafter particularly described with reference to the accompanying drawing.

This drawing is a central vertical section through one end of a swimming bath, with certain parts of the apparatus shown in elevation for clarity.

In this drawing, the swimming bath has a bottom 1, an end wall 2, and a side wall 3, and is filled with water up to a level 4.

The usual main drain 5 leads through a pipe 6 to a stopcock 7 for controlling the emptying of the bath in the usual way.

At a point beyond the end wall 2 of the bath there is provided a housing 8 for certain water-treating means to be described below. In the housing is arranged a first vertical pipe 9 which leads through a horizontal portion to a siphon seal 10 of conventional construction. The siphon seal has an outflow into the main drain pipe 6, and also has a vent pipe 11 opening at its top end to the atmosphere.

The vertical pipe 9 has three inlets 12, 13, 14 arranged at different levels of the bath. As illustrated, the two lower inlets 13 and 14 are temporarily closed off by sealing caps 15. Each inlet is coupled to a double-bore union 16 to any one of which there can be coupled a double-bore union 17 of a casing 18 containing a relatively coarse filter. The filter casing has connected thereto a first flexible hose 19 connected in turn to a collector hood 20 mounted on a handle 21.

If water from the appropriate level of the swimming bath is allowed to flow down the vertical pipe 9, a suction is caused in the flexible hose 19 and water continues to be drawn in through the collector hood 20 by the well known siphon action. Accordingly, so long as there is a suitable head of water available, water will be sucked into the collector hood 20. The hood can accordingly be used for collecting sediment and the like from the bottom and walls of the swimming bath.

When the level of the water in the bath has dropped somewhat below the level of the inlet 12 of the pipe 9, the siphon suction action will no longer be available. Accordingly, the filter casing 18 is disconnected from the top inlet 12 and is connected instead on the intermediate inlet union 16, after removal of its sealing cap 15. A sealing cap is then placed on the uppermost inlet union 16. The device can then be used again in similar manner until the water level has again dropped below the intermediate union. The same steps are then carried out, i.e. the filter casing is then coupled to the lowermost inlet union, and a sealing cap is placed on the intermediate union. This permits the action to continue until the bath is substantially empty.

Referring now to a second aspect of the invention, the housing 8 contains a second vertical pipe 22 having a top outlet 23, an intermediate outlet 24, and a bottom outlet 25. The top outlet is extended rearwardly to form a venturi tube 26 in which is coaxially disposed a jet 27 fed with fresh water through a valve 28 from a main water supply pipe 29. The venturi tube is connected to the upper end of a vertical processing chamber 30 having a hinged air-tight cover. The lower end of the chamber 30 is connected through a valve 31 to a pipe 32 leading from an inlet in the wall of the bath. The vertical chamber 30 contains an inserted filter pack 33 and an inserted purifying pack 34. A pipe 30a leads from the chamber 30 to the vertical pipe 22.

The outlets 23, 24 and 25 form the second bore of each of the unions 16, and the filter casing 18 has therein a through pipe connection to a second flexible hose 35 leading to a distributor pipe 36 with a number of nozzles 37 situated within the collector hood 20.

If the valve 28 is opened to admit main water under pressure, the stream of water passing through the jet 27 causes a lowering of pressure in the venturi tube 26. This lowering of pressure is transmitted to the vertical chamber 30 so that, if the valve 31 is opened, water is sucked in through the inlet in the wall of the bath and through the pipe 32, thereby causing the extracted water to pass firstly through the filter pack 33 and thereafter through the purifying pack 34, after which it flows with the fresh main water through the hose 35 and is recirculated into the bath through the distributor pipe 36.

The passage of the main water under pressure through the hose 35 and out of the nozzles 36 of the distributor in the form of relatively strong jets permits these jets to be used for disturbing the sediment and sludge resting on the bottom and walls of the bath, with the result that the dislodged sediment is then easily taken up by the collector hood 20.

If it is desired simply to use the main water for dislodging of sediment, without also recirculating filtered and purified water extracted from the bath, the valve 31 is kept closed, and there is then a simple through flow of main water from the jet 27 into the outlet 23. It will be appreciated that if the filter casing 18 is temporarily connected to the intermediate union or the bottom union, the main water delivery takes place down the vertical pipe 22.

Where the apparatus is used solely for sucking up sediment, it is powered solely by the water derived from the bath itself. Where it is used also for either disturbing the sediment, or for disturbing the sediment and recirculating filtered and purified water, it is powered additionally by the inflow of main water. No other powering means are required.

It will be appreciated that a number of sets of the apparatus could be positioned at appropriate points about a large bath, or a number of sets of vertical pipes 9 and 22 could be positioned at different points and connected to a single set of apparatus. Any desired number of inlet and outlet unions could be provided for the pipes 9 and 22, and the number thereof need not be restricted to three as shown.

The filter in the casing 18 would generally be of a somewhat coarse nature, to collect small pieces of twigs, leaves, buttons and matter of like size, whereas finer particles could be collected by the filter pack 33.

Although the two hoses 19 and 35 have been shown as separate, they could be coupled side by side or provided in a common protective tube, or again formed as twin bores in a single hose.

The siphon 10 is a known device which serves to seal the end of the horizontal part of the downflow pipe 9 and to maintain the pressure therein.

The chamber 30 is so constructed that replacement filter packs and purifying packs can be simply dropped in from the top end after removal of the used packs, the cover being an airtight fit.

The apparatus could be used with other containers for liquids, e.g. water tanks, reservoirs, etc.

I claim:
1. An apparatus for cleaning liquid containers such as swimming baths and water storage tanks comprising a sediment collector including openings for outflow therefrom of liquid to disturb sediment and other openings for inflow thereinto of liquid containing sediment, flexible hose means having liquid inflow and liquid outflow passages connected respectively to the outflow and inflow openings of the collector, a siphon communicating with the container to receive liquid from said container to operate the siphon, said siphon having a suction inlet communicating with the outflow passage of the hose means, and means for connecting of a pressure liquid supply to the inflow passage of the hose means.

2. An apparatus for cleaning liquid containers such as swimming baths and water storage tanks comprising a sediment collector including openings for outflow therefrom of liquid to disturb sediment and other openings for inflow thereinto of liquid containing sediment, flexible hose means having liquid inflow and liquid outflow passages connected respectively to the inflow and outflow openings of the collector, a siphon communicating with the container to receive liquid from said container to operate the siphon, said siphon having a suction inlet communicating with the outflow passage of the hose means, a jet and associated venturi device wherein the venturi has a suction inlet and a liquid outlet, said venturi outlet being connected to the inflow passage of the hose means, a processing chamber having an outlet connected to the suction inlet of the venturi and an inlet communicating with the container, means in said processing chamber for treating liquid passed through it, and means for connecting said jet to a pressure liquid supply.

3. An apparatus for cleaning liquid containers such as swimming baths and water storages tanks comprising a sediment collector including openings for outflow therefrom of liquid to disturb sediment and other openings for inflow thereinto of liquid containing sediment, flexible hose means having liquid inflow and liquid outflow passages connected respectively to the outflow and inflow openings of the collector, a siphon communicating with the container to operate the siphon, a plurality of inlets in the container wall communicating with a suction inlet of said siphon, a plurality of outlets in the container wall communicating with means for connecting a pressure liquid supply, said plurality of inlets and outlets being arranged as associated pairs at different levels on the container wall, and means for connecting the outflow and inflow passages of the hose means to any selected one of said pairs of associated inlets and outlets.

4. An apparatus for cleaning liquid containers such as swimming baths and water storage tanks, as claimed in claim 1, wherein the outflow passage of the hose means includes a filter.

5. An apparatus for cleaning liquid containers such as swimming baths and water storage tanks, as claimed in claim 1, wherein the container has a main drain, and wherein the siphon has an outlet which is connected to the main drain through a siphon seal.

References Cited by the Examiner
UNITED STATES PATENTS 2,247,116   6/1941   Day _____ 210—169
3,108,298   10/1963  Gelinas _____ 15—1.7

FOREIGN PATENTS 924,780   5/1963   Great Britain.

CHARLES A. WILLMUTH, *Primary Examiner.*